Dec. 22, 1953          R. LEE          2,663,202
DRILL HEAD
Filed July 18, 1951          2 Sheets—Sheet 1
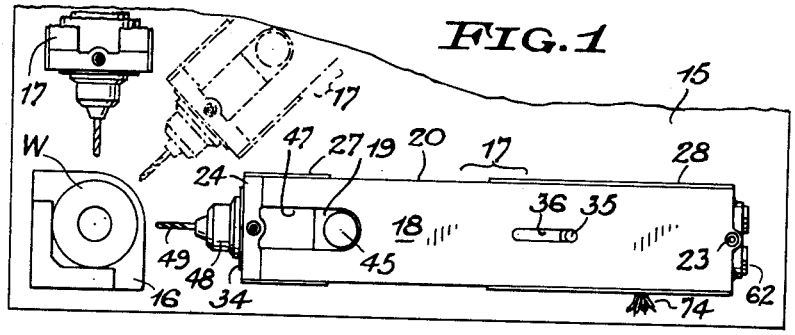
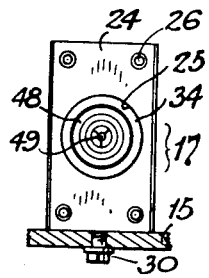
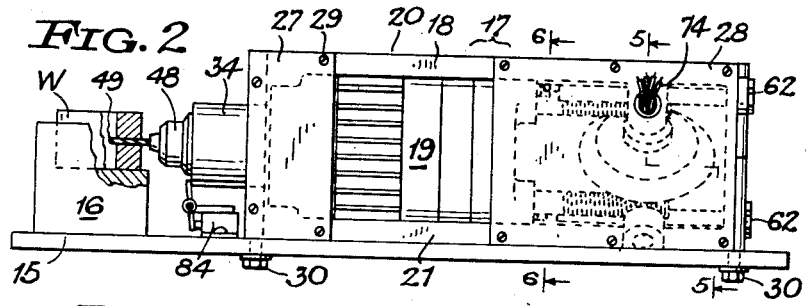
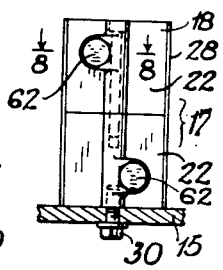
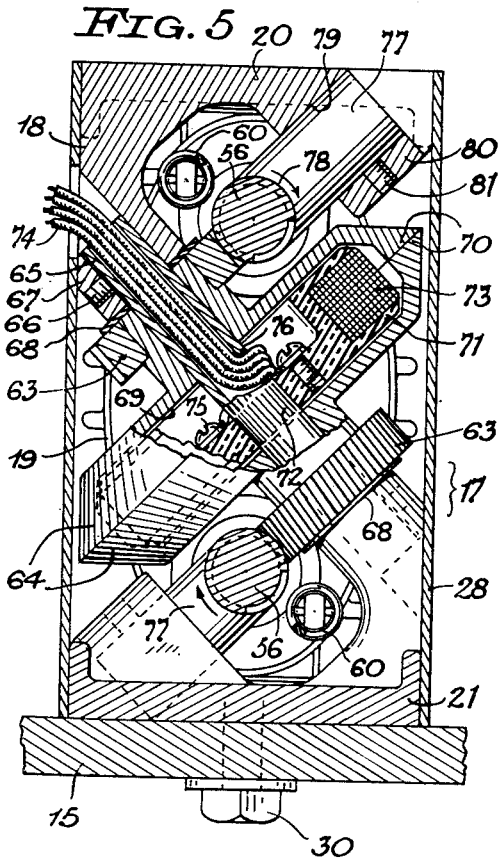
INVENTOR
ROYAL LEE
BY Christopher L. Waal
ATTORNEY Dec. 22, 1953   R. LEE   2,663,202
DRILL HEAD
Filed July 18, 1951
2 Sheets-Sheet 2
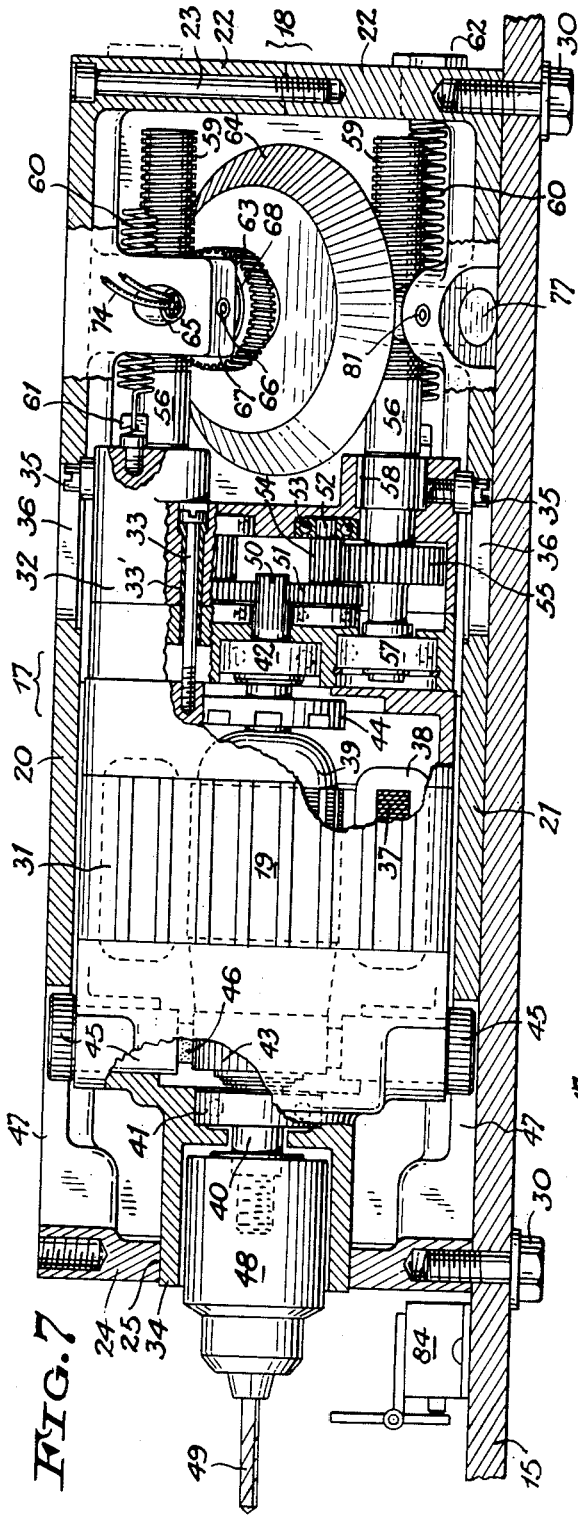
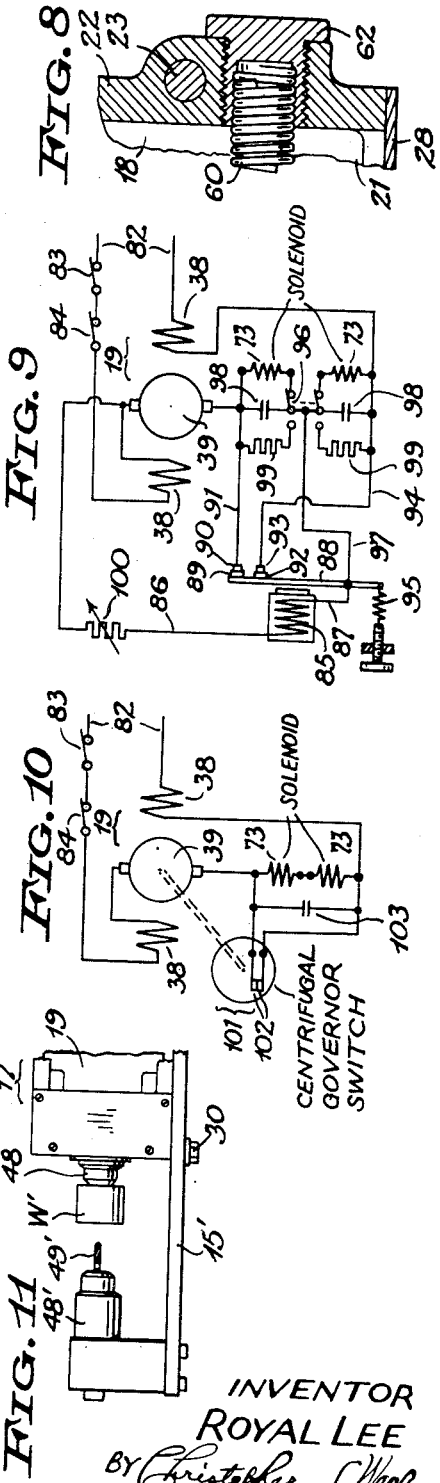
INVENTOR
ROYAL LEE
BY Christopher L. Wool
ATTORNEY Patented Dec. 22, 1953

2,663,202

UNITED STATES PATENT OFFICE 2,663,202

DRILL HEAD

Royal Lee, Elm Grove, Wis., assignor to Lee Engineering Company, Milwaukee, Wis., a corporation of Wisconsin Application July 18, 1951, Serial No. 237,433

12 Claims. (Cl. 77—32)

The present invention relates to machine tools and more particularly to tool heads for effecting drilling and other tool operations.

An object of the invention is to provide a power-driven tool head having feeding means which will avoid excessive feeding pressure on the drill or other tool.

Another object is to provide an improved form of releasable drive for the tool feeding means.

Still another object is to provide a tool head having a power-driven spindle under the control of speed regulating means which also controls the feeding pressure.

A further object is to provide a tool head having a reciprocable motor-driven tool which is automatically advanced when the motor is energized and is automatically retracted when the motor is deenergized.

A still further object is to provide an improved tool head which is of simple and compact construction, and which is capable of inexpensive manufacture.

The invention further consists in the several features hereinafter described and claimed.

In the accompanying drawings, illustrating certain embodiments of the invention, Fig. 1 is a plan view of a drilling machine including drill heads of the invention, the drill heads having their spindles in retracted position;

Fig. 2 is a side elevation of the drilling machine, a drill spindle thereof being in advanced position, and parts being broken away and parts being shown in section;

Fig. 3 is a front end view of one of the drill heads;

Fig. 4 is a rear end view of the drill head;

Fig. 5 is a transverse sectional view taken generally on the line 5—5 of Fig. 2;

Fig. 6 is a transverse sectional view taken generally on the line 6—6 of Fig. 2;

Fig. 7 is a longitudinal sectional view of the drill head, the drill spindle thereof being in retracted position;

Fig. 8 is a detail sectional view taken on the line 8—8 of Fig. 4;

Fig. 9 is a diagrammatic view of a speed controlling system for the drill head motor;

Fig. 10 is a diagrammatic view of another speed controlling system, and

Fig. 11 is a fragmentary view of a modified form of drilling machine.

In the drawings, 15 designates a suitable base, such as a machine table, carrying a work holder 16 on which a work piece W is detachably mounted. The base 15 has secured thereon one or more tool units or drill heads 17 of the invention, three drill heads being shown and being placed at an angle to each other. The drill heads are here shown to extend horizontally and radially of the work piece, but if desired, they may be arranged vertically or in various other positions to suit the work at hand.

Each drill head 17 comprises an elongated frame 18 of rectangular cross-section forming a housing in which an electric motor 19 is longitudinally reciprocable. The frame includes complementary top and bottom frame plates 20 and 21, each being flanged along its opposite side edges. The frame plates have rear end walls 22 in edgewise abutment and secured together by a screw 23, Fig. 7. The frame 18 further includes a rectangular front plate 24 with a central through bore 25, the front plate connecting the front ends of the frame plates 20 and 21, and being secured thereto, as by screws 26. The frame plates are further connected by spaced front and rear side plates 27 and 28 secured to the opposite side edges of the frame plates, as by screws 29. The drill head frame 18 is rigidly secured to the table 15, as by screws 30 threaded into the front plate 24 and the rear portion of the bottom plate 21.

The axially shiftable electric motor 19 includes a sectional casing 31 to the rear end of which a gear casing 32 is secured by screws 33, these screws passing through hollow screws 33' which connect parts of the gear casing. The front end of the motor casing has a coaxial tubular extension 34 which is slidable in the guide bore 25 of the frame front plate 24, and the gear casing is provided with aligned projecting screw studs 35 which are slidable in longitudinal guide slots 36 formed in the upper and lower plates of the drill head frame 18, thus limiting the maximum axial travel of the motor. A stator field core 37 of the motor is mounted in the motor casing 31 and carries field windings 38. A rotor or armature 39 is rotatable in the field core and includes a shaft 40 journalled in ball bearings 41 and 42. The armature 39 is provided with a commutator 43 and a cooling fan 44, and the motor casing 31 mounts brush holders 45 carrying brushes 46 bearing on the commutator, the outer ends of the brush holders being movable in clearance slots 47 formed in the frame plates 20 and 21. The armature shaft 40 forms a tool spindle and its front end extends coaxially into the tubular casing extension 34 and carries a drill chuck 48 of any conventional type. The drill chuck is partially housed in the casing extension 34 and has a forwardly projecting portion carrying a drill 49.

A pinion 50 is formed on the rear end of the armature shaft and meshes with gears 51 on a pair of parallel idler shafts 52 disposed at opposite sides of the pinion 50. The idler shafts are journalled in ball bearings 53 mounted in the gear casing and provided with respective pinions 54 which mesh with gears 55 on the front portions of a pair of parallel feed shafts 56. Each feed shaft is journalled in a ball bearing 57 and needle bearing 58 mounted in the gear casing to the front and rear, respectively, of the gear 55. The feed shafts are suitably confined against relative axial displacement with respect to the gear casing and have screw-threaded rack-forming portions 59 projecting rearwardly of the gear casing. By the speed-reducing gearing above described the feed shafts are driven by the motor shaft at a suitable low rate of speed, the feed shafts rotating in the same direction.

The slidably mounted motor 19 is urged rearwardly under the constant retracting force of a pair of coiled tension springs 60 extending parallel to the motor shaft, the front ends of the springs being anchored on hook members 61 secured to the gear casing, and the rear ends of the springs being screwed into hollow plugs or bushings 62, Fig. 8, threaded into the rear end wall 22 of the drill head frame.

The screw-threaded feed shafts 56 are in constant mesh with respective nut-forming worm gears 63 secured on the hub portions of respective friction disks 64 which are disposed in confronting coaxial relation. The two disks, which are of magnetizable material, such as cast iron, are rotatably mounted on a stationary hollow shaft 65 disposed at an angle of 45° in a plane perpendicular to the plane of the feed shafts 56, the hollow shaft 65 extending in the space between the two feed shafts, and the axis of the hollow shaft intersecting the projected axis of the motor shaft. The opposite ends of the hollow shaft are secured, as by screws 66, in bosses 67 formed on the upper and lower frame plates, and thrust washers 68 are placed between each boss 67 and the adjacent worm gear 63. The confronting portions of the two friction disks are cupped to form coaxial circular cavities or recesses 69 and marginal braking surfaces 70 of flat annular shape adapted to bear against each other. The peripheries of the two disks are beveled so as to conserve space. A stationary insulating spool or bobbin 71 is disposed in the space formed by the disk cavities 69 and is pressed onto a knurled portion 72 of the hollow shaft 65. A magnetizing winding or solenoid 73 is carried by the bobbin 71 and may be formed in one or more sections to suit various control circuits, two sections being indicated in Fig. 9. Current is conducted to the winding 73 by wires 74 which pass into the hollow shaft 65 and are connected to terminal screws 75 carried by the bobbin, the hollow shaft having a lateral opening 76 to admit the wires. If desired, the hollow shaft 65 may be of magnetizable metal.

At the side opposite each worm gear 63, the associated feed shaft 56 is engaged by a thrust bearing member 77 extending radially of the feed shaft and having a transversely grooved end 78 slidably saddled over the feed shaft. The outer end portion of the bearing member adjustably fits in a bore 79 formed in a lug 80 on the adjacent frame plate, and is secured to the lug by a set screw 81.

When the motor 19 is in operation, the motor shaft drives the screw-threaded feed shafts 56 at a suitable low rate of speed through the associated speed-reducing gearing. Whenever the solenoid winding 73 is not energized, the friction disks 64 are free to rotate on the hollow shaft 65, and are then rotated idly in opposite directions by the worm gears 63 thereon meshing with the rotating feed shafts. In this condition, the drilling motor is held in its retracted position by the coiled tension springs 60.

In order to effect feeding of the drilling motor 19, the worm gears 63 are restrained against rotation to form reaction members, and such restraint is effected by suitably energizing the solenoid winding 73, whereupon rotation of the feed shafts 56 meshing with the then stationary nut-forming worm gears 63 will advance the drill into the work. However, as soon as the solenoid is deenergized, the worm gears 63 will be free to turn, and the drilling motor will immediately be retracted by the coiled springs 60, the rack-forming feed shafts 56 idly rotating the worm gears 63 during the retracting travel of the motor. Since the friction disks 64 are rotatable in opposite directions, there is substantially no torque or turning effort on the solenoid and its stationary supporting shaft 65 when the solenoid is energized. By reducing the solenoid current, the friction disks will slip when the drill encounters a predetermined resistance, thus limiting the feeding pressure.

In accordance with a further feature of the invention, the braking solenoid 73 is automatically controlled so as to limit the drilling pressure and to retract the drilling motor at the end of a drilling operation. For this purpose, the drilling motor is of a type in which speed decreases with load. It is preferred to provide a series or universal type motor, as shown in Fig. 9, although it is possible to use certain other motors, such as repulsion motors, having similar characteristics. The motor is under the control of speed governing means which in Fig. 9 is shown to be of a remotely-operated type responsive to armature voltage. By way of example, the speed controlling system of Fig. 9 is generally similar to that disclosed in my United States Patent 2,113,234 for Electrical Regulator, issued April 5, 1938. However, the system of the present invention controls not only the speed of the motor but also the operation of the braking solenoid.

Referring to the circuit of Fig. 9, the series motor 19 has its armature 39 connected between the field windings 38, and the latter are connected to line conductors 82 furnishing either direct or alternating current. One of the line conductors has a manually operable control switch 83, and in some instances may also have a limit switch 84. By way of example, the limit switch may be mounted on the machine table 15, Figs. 1 and 7, for actuation by the front extension 34 of the motor casing. The limit switch is suitably resettable, as by delayed action or otherwise.

A voltage coil or electromagnet 85 is connected to one of the motor brushes by a conductor 86 and to the other brush by way of a conductor 87, a movable element or armature 88 of the electromagnet, a contact 89 on the movable element engageable with a stationary contact 90, and a conductor 91. The movable element 88 also carries a contact 92 engageable with a stationary contact 93, the latter being connected with one of the field windings 38 by a conductor 94, so as to complete the motor circuit when the several contacts are engaged. The movable element 88 is spring-urged to contact-making position, as by means of an adjustably tensioned coiled spring 95. The contacts 89, 90 and 92, 93 form a pair of series-connected circuit-closers which operate simultaneously and are connected in series in the motor circuit. The winding sections of the drill head solenoid 73 are connected in series by an intervening double-pole double-throw switch 96 and are shunted across the double-break governor switch formed by the series-connected circuit closers 90, 91, and 92, 93. The switch 96 forming the junction between the solenoid sections is connected to the movable element 88 by a conductor 97. Each solenoid section is also shunted by a spark-reducing condenser 98. In some cases, as hereinafter explained, the solenoid sections may be replaced in the circuit by substitute impedances 99, this circuit change being effected by actuating the double-throw switch 96 to its other position. An adjustable impedance 100 is connected in the conductor 86 to form a speed control.

In the operation of the drilling head, closing of the control switch 83 energizes the electric motor 19, the motor current flowing through the governor switch contacts 89, 90, and 92, 93 and causing the motor armature to rotate and increase in speed. As the motor speed increases the voltage across the armature also increases and is impressed on the coil 85, causing the movable member 88 to be attracted and the associated contacts to separate at a predetermined motor speed. As soon as the governor contacts open the solenoid winding 73 is energized by the motor current flowing therethrough, thus holding the friction disks 64 and their worm gears 63 against rotation. The slow rotation of the screw-threaded feed shafts 56 meshing with the then stationary worm gears thereby advances the drilling motor on its feeding stroke against the force of the retracting springs 60. During rotation of the motor shaft the governor contacts repeatedly open and close, but their open periods are much longer than their closed periods, so that while the motor is running without load the solenoid winding will be energized most of the time. As soon as the advancing drill engages the work piece the motor will tend to slow down, and if the feeding pressure on the drill exceeds a safe predetermined value, the motor will slow down below the governed speed, causing closing of the governor contacts and consequent deenergization of the solenoid winding 73. The springs 60 thereupon slightly retract the drill motor, reducing the load on the drill, and the motor again speeds up and opens the governor contacts, causing resumed feeding of the drill. As a result the drill feeds into the work piece at a suitable rate which will not damage the drill or the work. The intermittent drill feed may also provide a chip breaking action. As the drill gradually becomes dull, the feeding rate gradually decreases because of the increased drilling resistance or load. In the absence of a limit switch, the forward travel of the drill head motor is limited by the abutment of the guide studs 35 with the front ends of the guide slots 36, the drilling operation being then completed. The attendant then opens the motor switch 83, thus deenergizing the motor and the solenoid winding 73 and permitting the springs 60 to retract the motor in readiness for a succeeding drilling operation. The work piece W is then removed from the work holder 16 and replaced by a fresh work piece. When two or more drill heads are provided, the drill heads may be operated either simultaneously or successively, depending on the nature of the work.

When the limit switch 84 is provided the motor circuit will be opened by the motor at a suitable point of its forward travel, thus causing automatic retraction of the motor.

In certain cases, it may be desirable to have the drill motor run continuously and still provide for feeding and retraction of the motor. For this purpose the switch 96 in the governor circuit forms a control switch and connects the governor contacts selectively with the solenoid winding sections and with the resistors 99. The switch 96 may be of the shorting or non-shorting type. When the switch 96 connects the solenoid winding in the shunting circuit, the drilling head will operate as above described, and when the switch is moved to its other position, the motor will continue to run at its governed speed, but the solenoid winding will be deenergized, thus causing the springs 60 to retract the drilling motor.

The drill chuck is here shown to have a direct drive with the motor shaft, but if desired the chuck may be driven through a conventional reducing gear, not shown, one form of which is disclosed in my Patent 2,406,389 for Electric Motor, issued August 27, 1946.

The modified form of speed regulating system shown in Fig. 10 includes a speed responsive switch 101 of the centrifugal type driven by the motor. The switch includes cooperating contacts 102 connected in series in the motor circuit, as between the armature and one of the field windings, and shunted by the solenoid winding 73 and by a condenser 103. The switch contacts open upon increase of motor speed, thus energizing the solenoid winding. By way of example, the governor of Fig. 10 may be similar to that disclosed in my Patent 1,767,146 for Variable Speed Electric Motor Switch, issued June 24, 1930. The system of Fig. 10 is otherwise similar to that of Fig. 9.

In the modified form of drilling machine shown in Fig. 11, the spindle unit or tool head 17 is secured to a base plate 15' and the chuck 43 of the spindle unit is adapted to carry a rotatable work piece W. A drill chuck 48' is fixed on the base plate and carries a stationary drill 49' which is coaxial with the motor shaft. In the operation of the machine the rotating work piece is advanced against the stationary drill, and the feed is controlled in the same manner as in the machine of Figs. 1 to 9.

The spindle units or drill heads of the invention may be incorporated in various types of machine tools. In certain types of cyclically operating machine tools the motor controlling switches 83 and 96 may be automatically actuated.

What I claim as new and desire to secure by Letters Patent is:

1. Machine tool apparatus, comprising an electric spindle-driving motor reciprocable on feeding and retracting movements, releasable actuating means operable by said motor for advancing said motor on a feeding movement, yieldable means urging said motor toward a retracted position upon release of said actuating means, and electromagnetic control means for engaging and releasing said actuating means at any point in the travel of said motor.

2. Machine tool apparatus, comprising an electric spindle-driving motor reciprocable on feeding and retracting movements, releasable actuating means operable by said motor for advancing said motor on a feeding movement, yieldable means urging said motor toward a retracted position upon release of said actuating means, and motor-speed-responsive control means for releasing said actuating means at a motor speed below a predetermined value.

3. Machine tool apparatus, comprising a reciprocable spindle shiftable on feeding and retracting movements, driving means for said spindle, releasable power-driven actuating means for advancing said spindle on a feeding movement, yieldable means urging said spindle toward a retracted position upon release of said actuating means, and means responsive to spindle speed for releasing said actuating means at a speed below a predetermined value and at any point in the travel of said spindle.

4. Machine tool apparatus, comprising an electric spindle-driving motor reciprocable on feeding and retracting movements, releasable actuating means operable by said motor for advancing said motor on a feeding movement, yieldable means urging said motor toward a retracted position upon release of said actuating means, electromagnetic control means for said actuating means including a winding which when energized renders effective said actuating means, and speed-governing switch means for said motor and in connected in circuit with said motor and in shunt to said winding and opening on attainment of a predetermined motor speed to energize said winding.

5. Machine tool apparatus, comprising an electric spindle-driving motor reciprocable on feeding and retracting movements, releasable actuating means operable by said motor for advancing said motor on a feeding movement, yieldable means urging said motor toward a retracted position upon release of said actuating means, electromagnetic control means for said actuating means including a winding which when energized renders effective said actuating means, and speed-governing means for said motor including a switch controlling the excitation of said winding.

6. Machine tool apparatus, comprising a frame, an electric spindle-driving motor shiftably carried by said frame and reciprocable on feeding and retracting movements, a motor-driven rack-forming screw shaft carried by said motor and extending parallel to the direction of motor travel, a nut-forming gear rotatably carried by said frame and constantly meshing with said screw shaft, control means releasably restraining the rotation of said gear, and yieldable means urging said motor toward a retracted position upon release of said gear, said gear when released being rotatable by said rack-forming screw-shaft during the retracting movement of the motor.

7. Machine tool apparatus, comprising a pair of relatively movable members one of which is reversibly shiftable on feeding and retracting movements, yieldable means urging said shiftable member toward retracted position, and power-actuated means for advancing said shiftable member on a feeding movement and for releasing said shiftable member for return by said yieldable means, said power-actuated means including a power-rotated rack-forming screw shaft on one of said members and a rotatably mounted nut-forming gear on the other member constantly meshing with said screw shaft, and control means releasably restraining the rotation of said gear, said gear when released being rotated by said rack-forming screw-shaft during the retracting movement of said shiftable member.

8. Machine tool apparatus, comprising a pair of relatively movable members one of which is reversibly shiftable on feeding and retracting movements, yieldable means urging said shiftable member toward retracted position, and power-actuated means for advancing said shiftable member on a feeding movement and for releasing said shiftable member for return by said yieldable means, said power-actuated means including a pair of power-operated screw shafts on one of said members and a pair of rotatably mounted gears on the other member meshing with said respective screw shafts, said screw shafts being disposed in parallel relation, and said gears being coaxial and rotatable in opposite directions, cooperating brake members rotatable with said gears, and control means for said brake members for releasably restraining the rotation of said gears.

9. Machine tool apparatus, comprising a pair of relatively movable members one of which is reversibly shiftable on feeding and retracting movements, yieldable means urging said shiftable member toward retracted position, and power-actuated means for advancing said shiftable member on a feeding movement and for releasing said shiftable member for return by said yieldable means, said power-actuated means including a pair of power-operated screw shafts on one of said members and a pair of rotatably mounted gears on the other member meshing with said respective screw shafts, said screw shafts being disposed in parallel relation, and said gears being coaxial and rotatable in opposite directions, cooperating magnetizable brake members rotatable with said gears, and control means for said brake members including a magnetizable winding between said brake members to effect engagement of said brake members and thereby restrain the rotation of said gears.

10. Machine tool apparatus, comprising a spindle shiftable on feeding and retracting movements, driving means for said spindle including an electric motor having an inverse speed-load characteristic, releasable actuating means driven by said motor for advancing said spindle on a feeding movement, yieldable means urging said spindle toward a retracted position upon release of said actuating means, and control means responsive to motor speed for releasing said actuating means upon reduction of motor speed.

11. Machine tool apparatus, comprising a work support and a tool support, one of said supports being reversibly movable and shiftable on feeding and retracting movements, yieldable means urging said movable support toward retracted position, releasable power-actuated means for advancing said movable support on a feeding movement and for releasing said movable support for return by said yieldable means, said power-actuated means including a power-rotated rack-forming screw shaft and a rotatably mounted nut-forming gear constantly meshing with said screw shaft, and control means for releasably restraining the rotation of said gear, said gear when released being rotatable by said screw-shaft during the retracting movement of the motor.

12. Machine tool apparatus, comprising a frame, an electric motor shiftably carried by said frame and reciprocable on feeding and retracting movements, a rotatable spindle at the front of said motor, a gear casing at the rear of said motor having speed-reducing gearing driven by said motor, a rack-forming screw shaft projecting rearwardly of said motor and driven by said gearing, said screw shaft extending parallel to the direction of motor movement, a nut-forming gear rotatably carried by said frame and constantly meshing with said screw shaft, control means releasably restraining the rotation of said gear to effect shifting of said motor in a feeding movement, and yieldable means urging said motor toward retracted position upon release of said gear, said gear when released being rotatable by said screw-shaft during the retracting movement of the motor.

ROYAL LEE.

References Cited in the file of this patent

UNITED STATES PATENTS

| Number | Name | Date |
|---|---|---|
| 1,434,946 | Fiorillo | Nov. 7, 1922 |
| 1,950,597 | Corwin | Mar. 13, 1934 |
| 2,035,283 | Schroeder | Mar. 24, 1936 |
| 2,153,195 | Lilja | Apr. 4, 1939 |